United States Patent
Van Der Spek et al.

(10) Patent No.: US 10,071,352 B2
(45) Date of Patent: Sep. 11, 2018

(54) TECHNIQUES FOR AGGLOMERATING MATURE FINE TAILING BY INJECTING A POLYMER IN A PROCESS FLOW

(71) Applicants: CiDRA Corporate Services Inc., Wallingford, CT (US); SUNCOR ENERGY INC., Calgary (CA)

(72) Inventors: Alex M. Van Der Spek, Rotterdam (NL); Douglas H. Loose, Southington, CT (US); Adrian Revington, Calgary (CA)

(73) Assignees: CiDRA CORPORATE SERVICES INC., Wallingford, CT (US); SUNCOR ENERGY INC. (CA)

( * ) Notice: Subject to any disclaimer, the term of this patent is extended or adjusted under 35 U.S.C. 154(b) by 482 days.

(21) Appl. No.: 14/648,285

(22) PCT Filed: Dec. 9, 2013

(86) PCT No.: PCT/US2013/073855
§ 371 (c)(1),
(2) Date: May 29, 2015

(87) PCT Pub. No.: WO2014/089555
PCT Pub. Date: Jun. 12, 2014

(65) Prior Publication Data
US 2015/0290608 A1    Oct. 15, 2015

Related U.S. Application Data

(60) Provisional application No. 61/734,586, filed on Dec. 7, 2012.

(51) Int. Cl.
*B01F 15/02* (2006.01)
*B01F 15/04* (2006.01)
(Continued)

(52) U.S. Cl.
CPC ........ *B01F 15/0408* (2013.01); *C02F 1/5209* (2013.01); *G01F 1/00* (2013.01);
(Continued)

(58) Field of Classification Search
CPC .. B01F 15/0203; G05D 11/135; G05D 11/136
(Continued)

(56) References Cited

U.S. PATENT DOCUMENTS 1,334,395 A * 3/1920 Patterson ............... A21C 1/145
137/4
2,626,786 A * 1/1953 McGlothlin ........ B01F 15/0408
137/92
(Continued)

FOREIGN PATENT DOCUMENTS

EP 0492664 7/1992
EP 2011143768 11/2011

*Primary Examiner* — David Sorkin
(74) *Attorney, Agent, or Firm* — Ware, Fressola, Maguire & Barber LLP

(57) ABSTRACT

Apparatus is provided featuring a signal processor or processing module configured at least to: a signal processor configured to: receive signaling containing information about at least one rheological parameter related to a fluid containing Mature Fine Tailings (MFTs) flowing through a process pipe; and determine a dosing of a polymer to the fluid so as to cause a polymer induced agglomeration of the MFTs in the fluid, based at least partly on the signaling received. The signal processor may be configured to provide corresponding signaling to control the dosing of the polymer to cause the polymer induced fine agglomeration of the MFTs in the fluid.

19 Claims, 12 Drawing Sheets

(51) Int. Cl.
*G01F 1/00* (2006.01)
*C02F 1/52* (2006.01)
*C02F 1/56* (2006.01)
*C02F 101/10* (2006.01)
*C02F 103/10* (2006.01)

(52) U.S. Cl.
CPC ......... *B01F 2215/0042* (2013.01); *C02F 1/56* (2013.01); *C02F 2101/10* (2013.01); *C02F 2103/10* (2013.01); *C02F 2209/001* (2013.01); *C02F 2209/006* (2013.01); *C02F 2209/03* (2013.01); *C02F 2209/40* (2013.01)

(58) Field of Classification Search
USPC .................... 137/4, 88, 92; 366/152.1–152.4
See application file for complete search history.

(56) References Cited

U.S. PATENT DOCUMENTS

| | | | | |
|---|---|---|---|---|
| 2,674,256 | A | * | 4/1954 | Ullman ................ G05D 11/137 137/183 |
| 2,904,401 | A | * | 9/1959 | Booth ................... B01F 1/0011 137/4 |
| 6,609,069 | B2 | | 8/2003 | Gysling |
| 6,752,165 | B2 | * | 6/2004 | Johansson ............. D21D 1/002 137/4 |
| 6,889,562 | B2 | | 5/2005 | Gysling et al. |
| 7,400,985 | B2 | | 7/2008 | Fernald et al. |
| 7,657,392 | B2 | | 2/2010 | Gysling |
| 7,673,524 | B2 | | 3/2010 | Bailey et al. |
| 7,895,903 | B2 | | 3/2011 | Bailey et al. |
| 2005/0246111 | A1 | | 11/2005 | Gysling et al. |
| 2012/0029120 | A1 | | 2/2012 | Soane et al. |
| 2012/0060930 | A1 | | 3/2012 | Van der Spek |
| 2012/0138542 | A1 | | 6/2012 | Dang-Vu et al. |

* cited by examiner

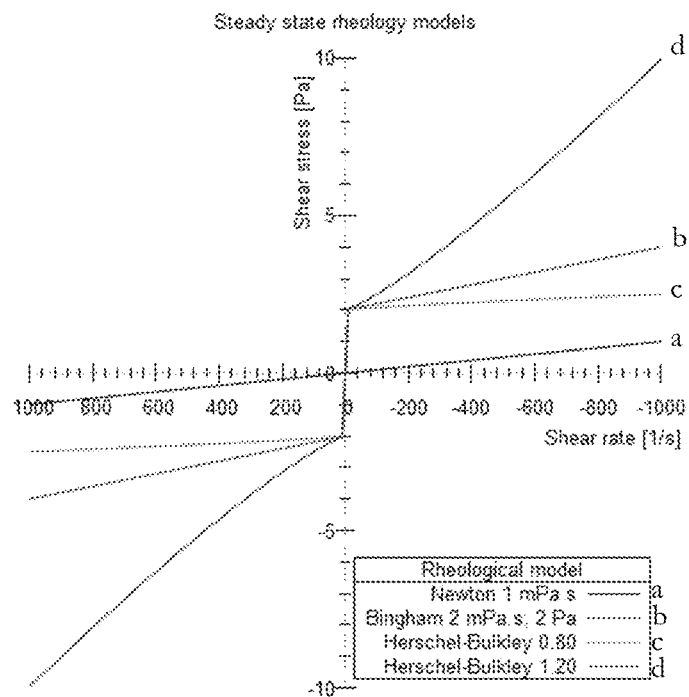
Figure 1a: Various rheological models compared.
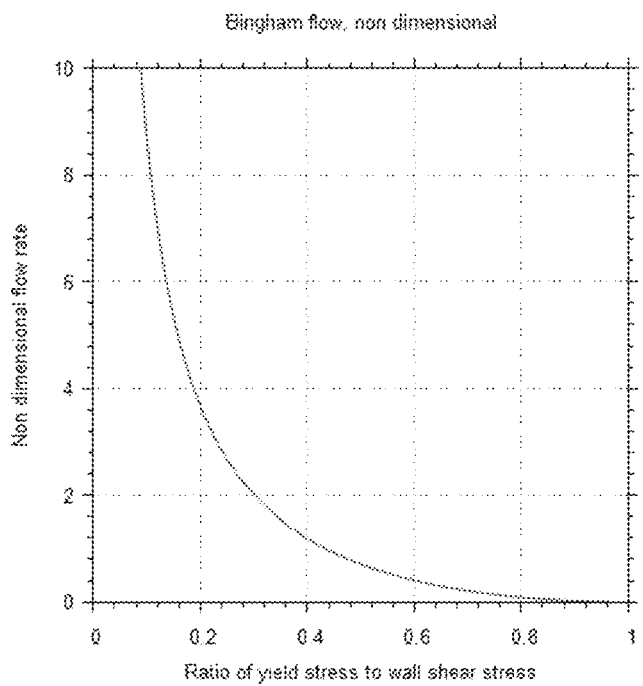
Figure 1b: Solution of the non-dimensional Bingham flow equation.

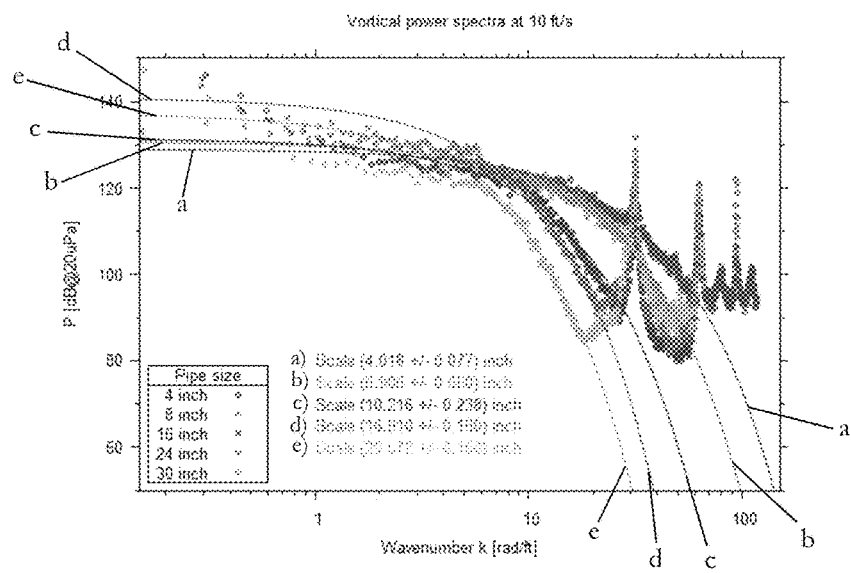
Figure 1c:   Vortical spectra at constant velocity.
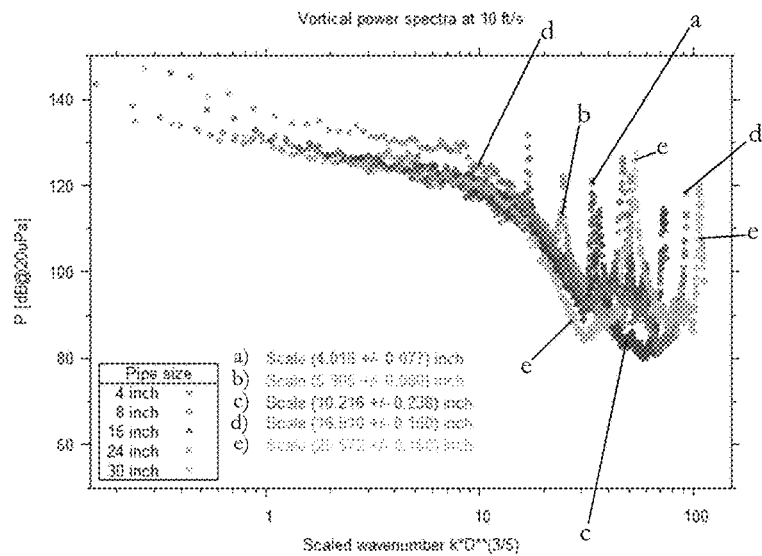
Figure 1d:   Vortical spectra with normalized wavenumber.

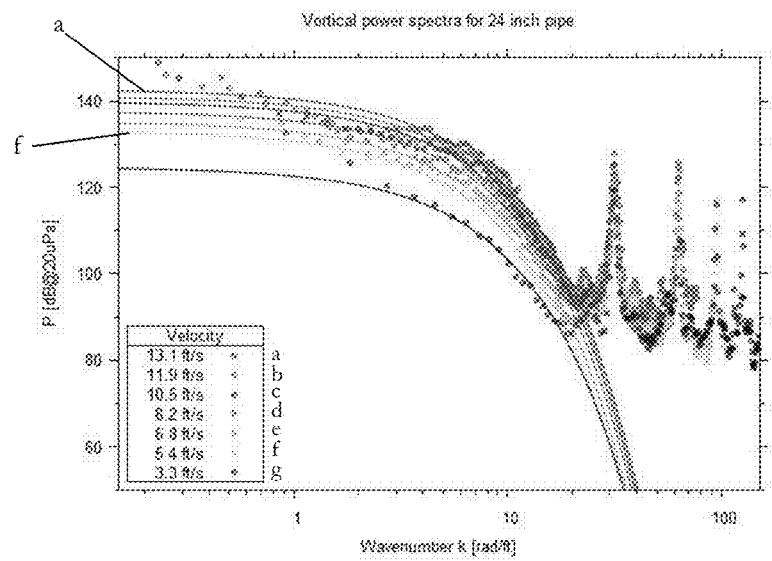
Figure 1e: Vortical spectra at constant pipe diameter.
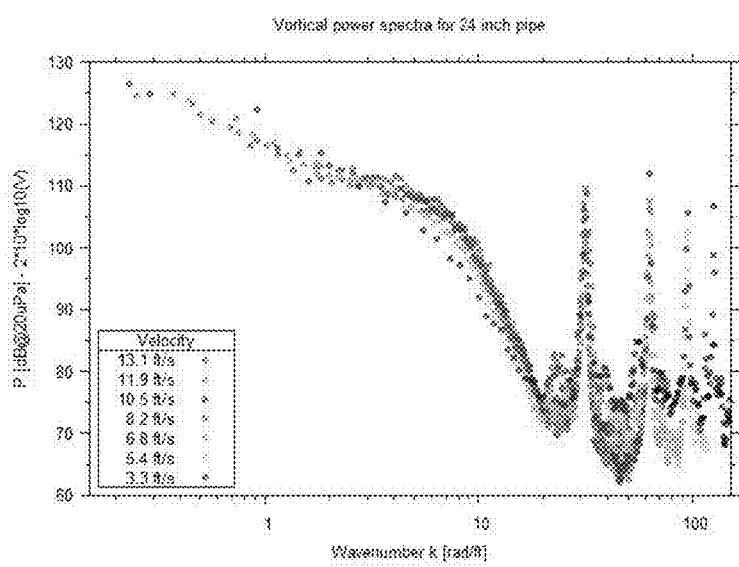
Figure 1f: Normalized vortical spectra at constant pipe diameter.

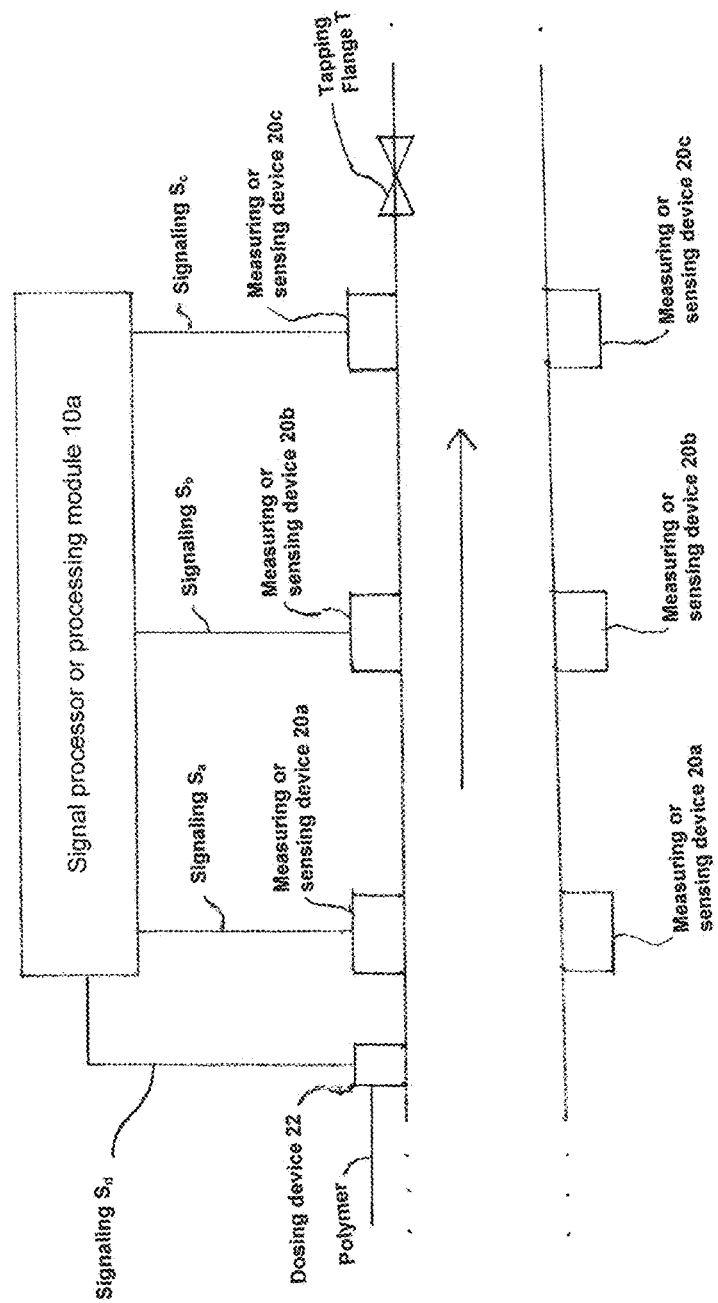
Figure 2: Apparatus 10

Apparatus 10

Signal processor or processing module 10a configured at least to:

receive signaling containing information about at least one rheological parameter related to a fluid containing Mature Fine Tailings (MFTs) flowing through a process pipe;

determine a dosing of a polymer to the fluid so as to cause a polymer induced agglomeration of the MFTs in the fluid, based at least partly on the signaling received; and/or provide corresponding signaling to control the dosing of the polymer to cause the polymer induced agglomeration of the MFTs in the fluid.

Other circuits, components or modules 10b to implement the functionality of the signal processor or processing module 10a, e.g., including memory modules, input/output modules, data and busing architecture and other signal processing circuits, wiring or components.

Figure 3:

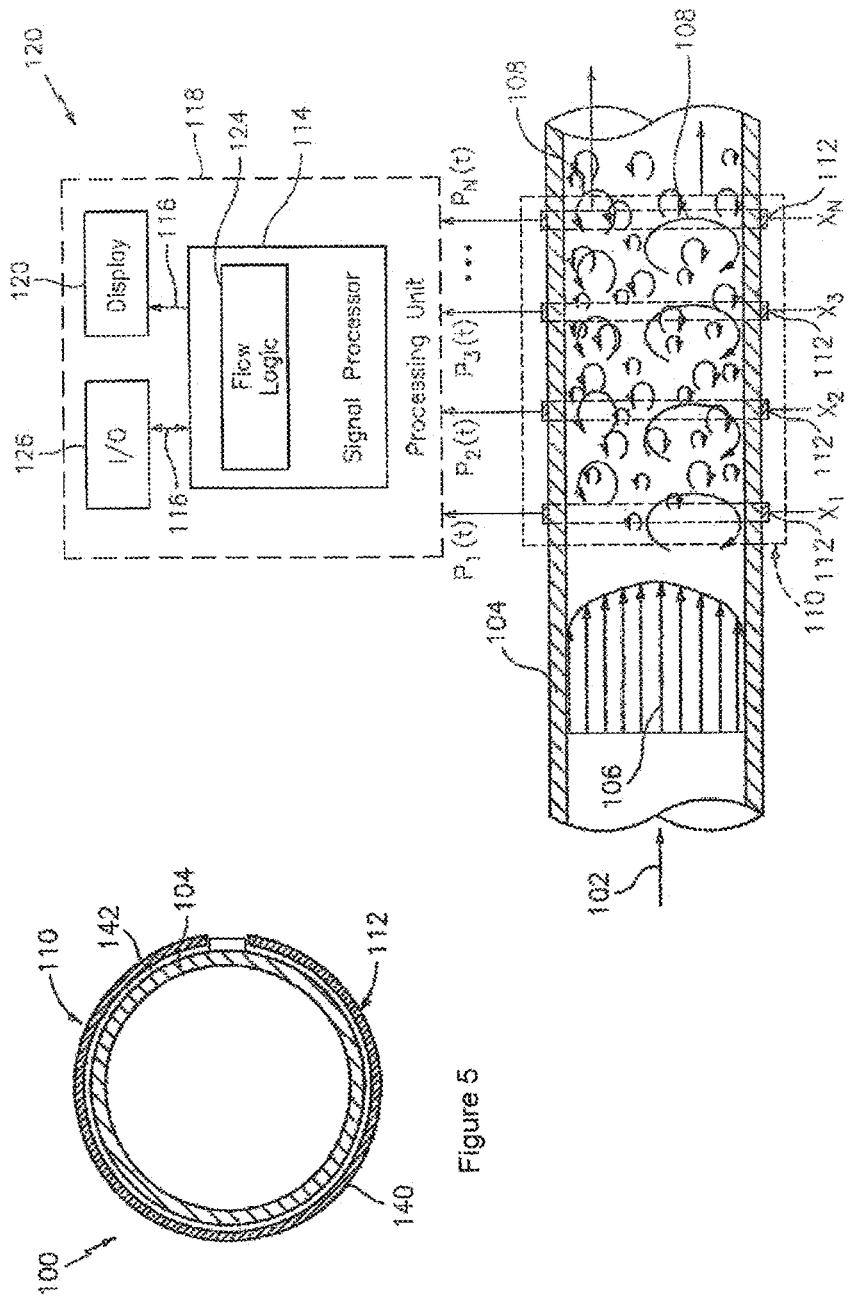

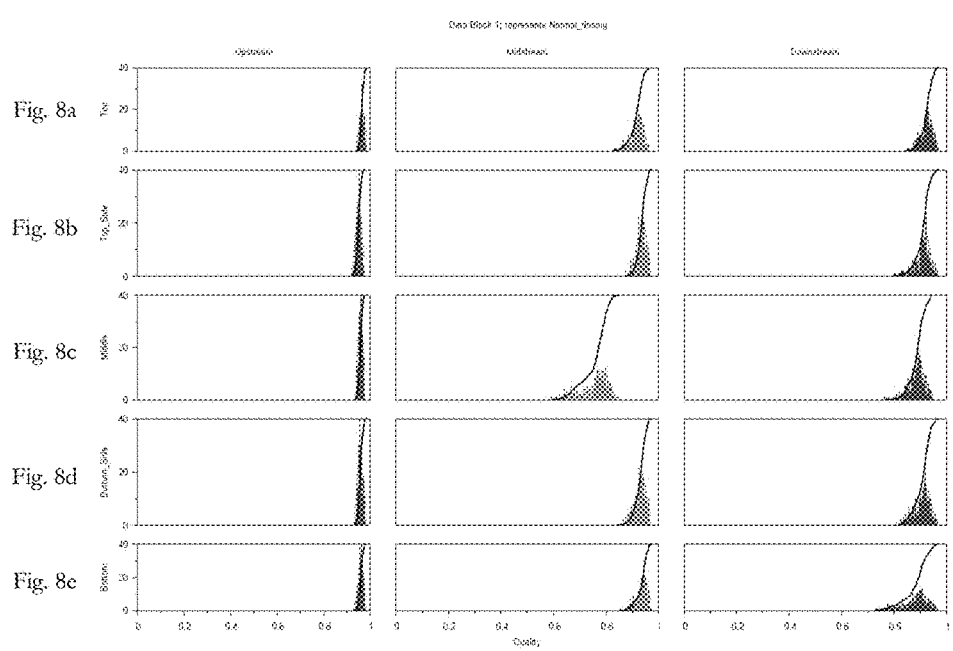
Figure 8: Distribution of flow qualities during normal dosing.

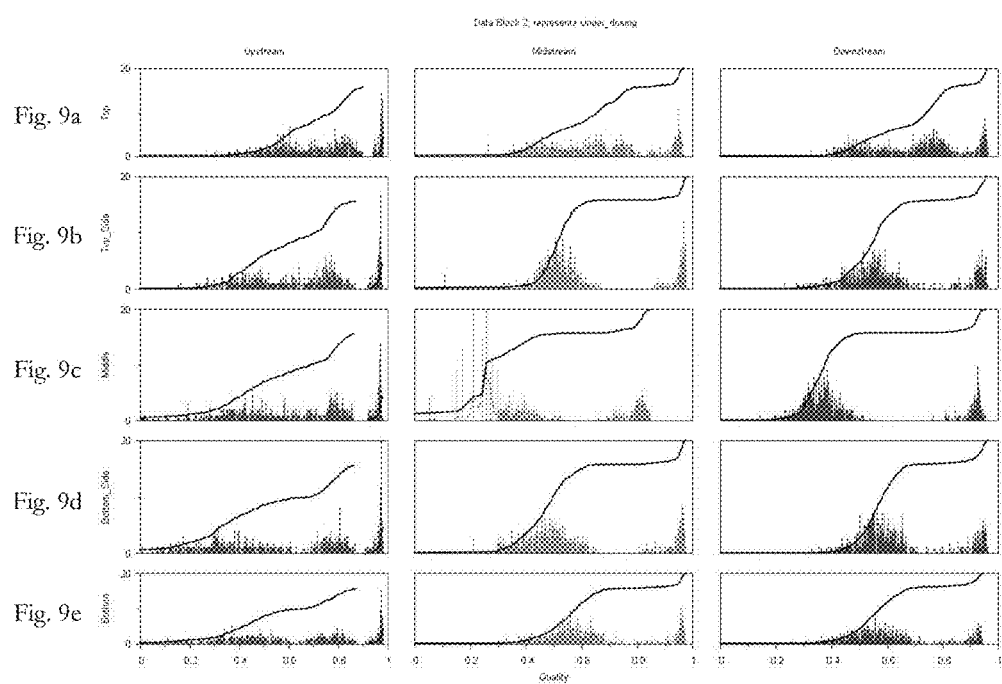
Figure 9: Distribution of flow qualities during under dosing

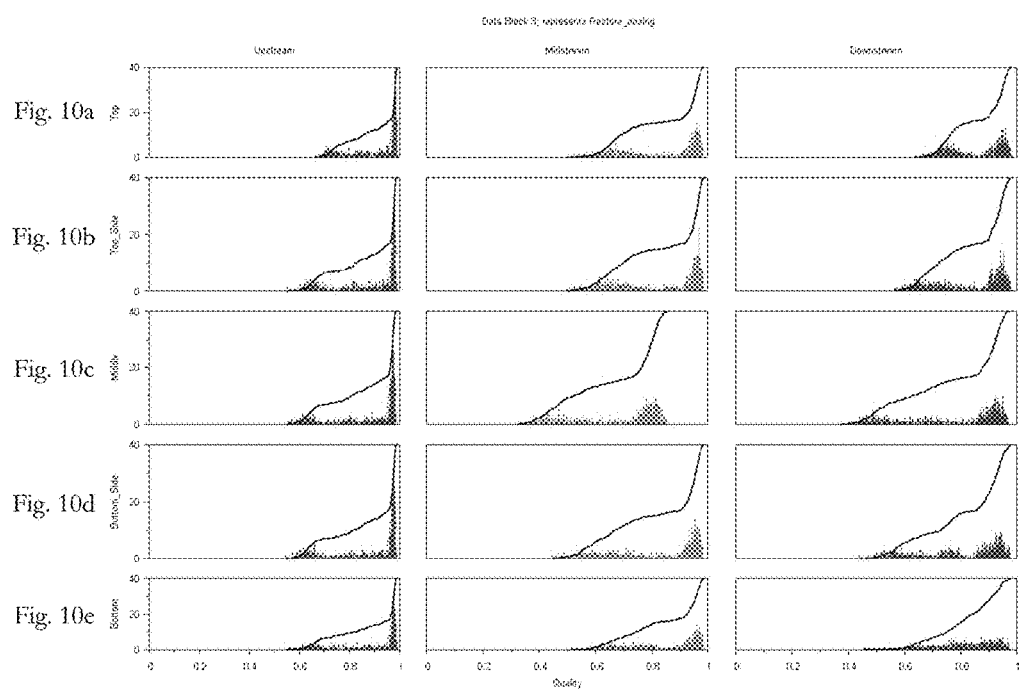
Figure 10: Distribution of flow qualities during transition dosing

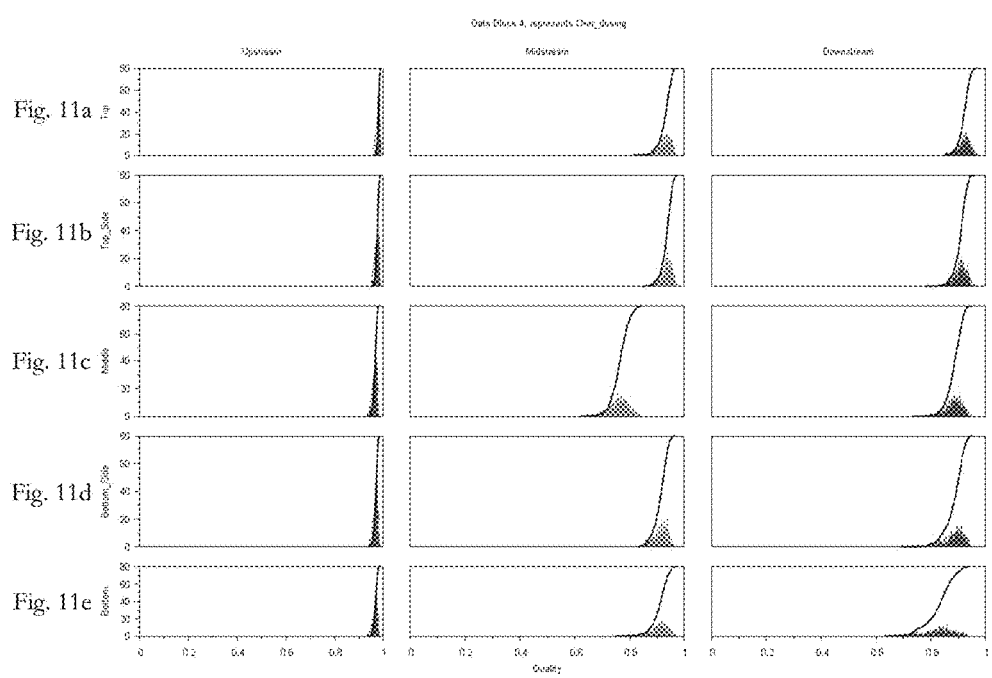
Figure 11: Distribution of flow qualities during over dosing.

TECHNIQUES FOR AGGLOMERATING MATURE FINE TAILING BY INJECTING A POLYMER IN A PROCESS FLOW

CROSS-REFERENCE TO RELATED APPLICATIONS

This application corresponds to international patent application serial no. PCT/US2013/073855, filed 9 Dec. 2013, which claims benefit to provisional patent application Ser. No. 61/734,586 (712-2.396//CCS-0110), filed 7 Dec. 2012, which is incorporated by reference in their entirety.

BACKGROUND OF THE INVENTION

1. Field of Invention

The present invention relates to techniques for agglomerating mature fine tailing in a process flow, e.g., by injecting a polymer.

2. Description of Related Art

During extraction of the oil from oil sand, tailings consisting of water, silt, clays and other solvents are also typically created. When applied to oil sands mining, the term "tailings" refers specifically to fine waste suspended in water. Over time, this solid will typically become mature fine tailings (MFT) by the gravity when settling.

MFT may be processed as a rheological fluid, which may be characterized by a non-Newtownian constitutive equation. Often a Bingham model or a Herschel-Bulkley model may be applied to model the rheological behaviour of MFT.

During processing, Bingham fluids are understood to exhibit a yield point, and wall shear stresses below the yield point will not result in flow. Otherwise the shear stress increases linearly with the shear rate.

In comparison, Herschel-Bulkley fluids are also understood to exhibit a yield point but the shear stresses increase either super-linearly or supra-linearly with the shear rate. Herschel-Bulkley fluids are therefore capable of modeling dilatant or pseudo-plastic behaviour.

FIG. 1a shows a comparison of the various constitutive equations for MFT. This figure is drawn to scale and contains representative values for MFT that were used in the evaluation and development of the present invention, consistent with that set forth below. For reference, the line labeled a represents water at room temperature which is purely a Newtonian fluid.

By way of example, in order to reduce the required size of tailings ponds and in order to reclaim water, MFT may be dried and used as backfill material. Polymer induced 'drying' MFT is a process under development which appears to yield substantial gains over natural drying techniques or mechanical drying methods. In polymer induced drying, a polymer may be added to a stream of MFT flowing in a pipe. Under the right conditions, MFT fines will floc and be susceptible to settling. However, there is currently no known technology to monitor the state of the reacting, floccing and possibly settling of a MFT/polymer slurry. As a result, it may be difficult to adjust the polymer dosing rate to cope with natural variability in the MFT. Likewise it is a challenge to adjust the shear rate in the reacting and floccing MFT such as not to shear apart the flocs.

SUMMARY OF THE INVENTION

According to FIG. 1a, differentiating between MFT in its initial state and a slurry of flocs that shows more Newtonian behaviour may be possible by simultaneous measurement of wall shear stress and wall shear rate. Monitoring the change in rheology with time along the reactor pipe would be possible if both the wall shear stress and the wall shear rate in the reactor pipe were available. It is possible to infer the wall shear stress from the pressure gradient, but it is much harder to find the wall shear rate.

Alternatively, the transition from a non-fully sheared Bingham like plug flow (which is non-turbulent) to fully developed turbulent flow may be monitored by measuring the decay of turbulent energy coupled with vorticity. This latter method effectively uses the fact that energy dissipation in turbulent flow occurs at a rate much higher than in the non-turbulent flow of virgin MFT.

Based on the aforementioned, the present invention sets forth two conceptually different ways of monitoring a change in rheology of a polymer induced fine agglomeration in Mature Fine Tailings (MFT).

One method is based upon monitoring wall shear stress (by measuring differential pressure) simultaneously with wall shear rate (obtained by velocity profiling, assuming a specific constitutive equation or by using historical, cross plotted data of rate of flow and pressure gradient).

The other method presumes that a change in rheology must be accompanied with a change in the mechanism of energy dissipation if not the rate thereof.

The inventors prepared and carried out a controlled field experiment, consistent with that set forth in the aforementioned provisional application. The Bingham model was used to solve for and predict such quantities as the differential pressure per meter of reactor pipe, the expected wall shear rate at a given rate of flow etc. The results helped place velocity meters, e.g., on a 60 m long reactor pipe, and helped dimension the required differential pressure gauges.

During the experimental testing, an induced and controlled sequence of underdosing to overdosing was undertaken. The changes in dosing were accompanied by a natural decrease in density of about the same magnitude and duration. The present invention is the by-product of knowledge gained during that experimental process, helped form the basis for new techniques for agglomerating mature fine tailing in a process flow, e.g., by a controlled dosing and injection of a polymer into a fluid containing MFTs flowing through the process pipe, which are disclosed in detail herein.

Examples of Particular Embodiments

According to some embodiments, the present invention may include, or take the form of, apparatus featuring a signal processor or processing module configured at least to:

receive signaling containing information about at least one rheological parameter related to a fluid containing Mature Fine Tailings (MFTs) flowing through a process pipe; and determine a dosing of a polymer to the fluid so as to cause a polymer induced fine agglomeration of the MFTs in the fluid, based at least partly on the signaling received.

The present invention may also include one or more of the following features:

The signal processor may be configured to provide corresponding signaling to control the dosing of the polymer to cause the polymer induced agglomeration of the MFTs in the fluid.

The signal processor may be configured to determine the dosing of the polymer based at least partly on a change in the at least one rheological parameter.

The at least one rheological parameter may include information about, or related to, a wall shear stress and a wall shear rate of the fluid.

The signal processor may be configured to determine the dosing of the polymer based at least partly on a ratio ζ of the wall shear stress and the wall shear rate.

The signal processor may be configured to determine the dosing of the polymer based at least partly on keeping the ratio ζ substantially constant by varying the dosing of the polymer.

The signal processor may be configured to determine an injection rate of the dosing of the polymer.

The signaling received may contain information about measurements related to a flow rate and a pressure gradient of the fluid; and the signal processor may be configured to determine the wall shear stress based at least partly on the measurements received.

The signaling received may contain information about measurements related to a differential pressure and a velocity profiling related to the fluid; and the signal processor may be configured to determine the wall shear stress based at least partly on the measurements related to the differential pressure, determine the wall shear rate based at least partly on the measurements related to the velocity profiling, and monitor the wall shear stress simultaneously with the wall shear rate.

The at least one rheological parameter may include information about energy dissipation related to the fluid.

The signaling received may contain information about array velocity measurements related to the fluid; and the signal processor may be configured to monitor a rate of energy dissipation related to the fluid, based at least partly on the array velocity measurements.

The signal processor may be configured to determine the wall shear stress $\tau_R$, using a signal processing algorithm based at least partly on equation (1), as follows:

$$\tau_R = \frac{R}{2}\frac{dp}{dx}, \quad (1)$$

where R is the inside radius of the process pipe and dp/dx is the pressure gradient along the axial dimension of the process pipe.

The signal processor may be configured to determine the dosing of the polymer using a signal processing algorithm based at least partly on the Buckingham Reiner equation, consistent with that set forth herein.

For example, the signal processor may be configured to determine a relationship between the wall shear rate and the wall shear stress, using a signal processing algorithm based at least partly on equation (2), as follows:

$$\tau_{yx} = -\mu_0 \frac{\partial v_x}{\partial y} \pm \tau_0, \quad (2)$$

where $\mu_o$ is the plastic viscosity of the fluid and $\tau_o$ is a yield point of the fluid.

The apparatus may also include a dosing device configured to respond to the corresponding signaling and to provide the dosing of the polymer to cause the polymer induced agglomeration of the MFTs in the fluid.

The apparatus may also include at least one measuring or sensing device configured to sense the at least one rheological parameter and provide the signaling containing information about the at least one rheological parameter.

The at least one measuring or sensing device may be configured in relation to the process pipe to measure or sense the information about the at least one rheological parameter and provide the signaling containing the information about the at least one rheological parameter.

The at least one measuring or sensing device may include at least one flow rate and pressure gradient measuring device configured to measure the flow rate and the pressure gradient of the fluid, and provide the signaling containing information about flow rate and pressure gradient measurements.

The at least one measuring or sensing device may include at least one differential pressure and velocity profiling measuring device configured to measure the differential pressure and the velocity profiling related to the fluid and provide the signaling containing information about differential pressure and velocity profiling measurements.

The at least one measuring or sensing device may include at least one array velocity sensing device configured to sense the array velocity measurements related to the fluid and provide the signaling received contains information about the array velocity measurements.

The signal processor or processing module may be configured with at least one processor and at least one memory including computer program code, the at least one memory and computer program code configured, with the at least one processor, to cause the apparatus at least to receive the signaling and determine the dosing of the polymer to the fluid so as to cause a polymer induced fine agglomeration of the MFTs in the fluid, based at least partly on the signaling received.

The Method

According to some embodiments, the present invention may take the form of a method featuring steps for receiving with a signal processor signaling containing information about at least one rheological parameter related to a fluid containing Mature Fine Tailings (MFTs) flowing through a process pipe; and determining with the signal processor a dosing of a polymer to the fluid so as to cause a polymer induced agglomeration of the MFTs in the fluid, based at least partly on the signaling received. The method may also include providing with the signal processor corresponding signaling to control the dosing of the polymer to cause the polymer induced agglomeration of the MFTs in the fluid, as well as one or more of the features set forth above.

According to some embodiments, the present invention may take the form of apparatus featuring means for receiving signaling containing information about at least one rheological parameter related to a fluid containing Mature Fine Tailings (MFTs) flowing through a process pipe; and means for determining a dosing of a polymer to the fluid so as to cause a polymer induced agglomeration of the MFTs in the fluid, based at least partly on the signaling received, as well as means for implementing one or more of the features set forth above.

BRIEF DESCRIPTION OF THE DRAWING

The drawing includes FIGS. 1-11, some of which may not necessarily be drawn to scale, as follows:

FIG. 1a shows a graph of shear stress (Pa) versus shear rate (1/s) with plots of various rheological models to be compared.

FIG. 1b shows a graph of non-dimensional flow rate versus a ratio of yield stress to wall shear stress as a solution of the non-dimensional Bingham flow equation.

FIG. 1c shows a graph of power versus wavenumber of vortical spectra at a constant velocity.

FIG. 1d shows a graph of power versus wavenumber of vortical spectra with a normalized wavenumber.

FIG. 1e shows a graph of power versus wavenumber of vortical spectra at a constant pipe diameter.

FIG. 1f shows a graph of power versus wavenumber of a normalized vortical spectra at a constant pipe diameter.

FIG. 2 shows apparatus according to some embodiments of the present invention.

FIG. 3 shows apparatus in the form of a signal processor or processing module for implementing signal processing functionality according to some embodiments of the present invention.

FIG. 4 is schematic diagram of an apparatus known in the art for determining at least one parameter associated with a fluid flowing in a pipe using a known spatial sensor array.

FIG. 5 is a cross-sectional view of a pipe having a spatial sensor array arranged thereon.

FIG. 8, including FIGS. 8a to 8e, shows top, top-side, middle, bottom-side and bottom process flows related to upstream, midstream and downstream distributions of flow quantities during normal dosing.

FIG. 9, including FIGS. 9a to 9e, shows top, top-side, middle, bottom-side and bottom process flows related to upstream, midstream and downstream distributions of flow quantities during under dosing.

FIG. 10, including FIGS. 10a to 10e, shows top, top-side, middle, bottom-side and bottom process flows related to upstream, midstream and downstream distributions of flow quantities during transition dosing.

FIG. 11, including FIGS. 11a to 11e, shows top, top-side, middle, bottom-side and bottom process flows related to upstream, midstream and downstream distributions of flow quantities during over dosing.

DETAILED DESCRIPTION OF BEST MODE OF THE INVENTION

Summary

Figure 6:
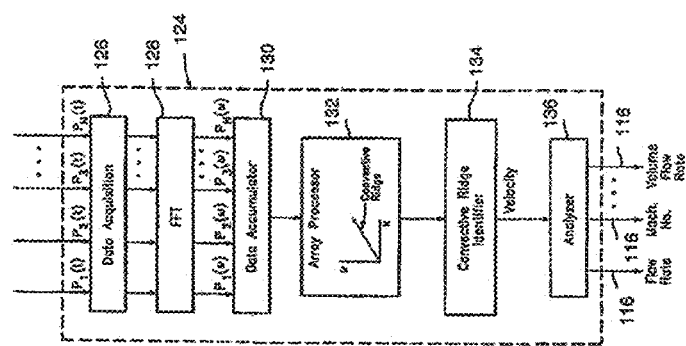
FIG. 6 is a block diagram of a flow logic known in the art.

In summary, according to the present invention, three conceptually different monitoring methods were evaluated and implemented, including:
1. Monitor settling of flocs by vertical velocity profiling.
2. Measure the wall shear rate and cross plot this versus wall shear stress.
   a. By measuring the (vertical) velocity profile.
   b. By assuming a specific rheological model.
   c. By inspection of the slope of a cross plot of flow and pressure drop.
3. Derive the degree of turbulence from the energy spectrum of vorticity.

Monitoring methods 1 and 2a require a velocity profile to be measured. Method 3 requires an array method in order to evaluate the spectral energy decay. In contrast, method 2b assumes a specific rheological model and thus likely prone to being in error, and method 2c cannot provide real time data, so was not further evaluated or implemented, consistent with that set forth herein.

The settling of, mostly coarse grained, particulate material in slurries has been the topic of a number of investigations. In all such investigations, a vertical velocity profile shows (much) lower velocities near the bottom of the pipe. On hydrotransport lines, conditioning slurry lines and tailings lines the velocity profile has been found to be an indicator of settling and may serve to help prevent 'sand-out' of the line.

Extending the velocity profile to the near wall region by applying the no-slip condition at the pipe wall allows for the calculation of the wall shear rate. It has been shown that the wall shear rate at the top of the pipe is appreciably different from the wall shear rate at the bottom of the wall.

Rheology

The basic rheological model is set forth below:

The wall shear stress plays an important role in pipe flow of rheological fluids. An integral momentum balance gives for the wall shear stress $\tau_R$:

$$\tau_R = \frac{R}{2}\frac{dp}{dx}. \tag{3}$$

Where R is the pipe's inside radius and dp/dx is the pressure gradient along the axial dimension of the pipe. The shear stress at the wall is also the maximum stress in the fluid. The profile of the shear stress in pipe flow is always linear as the momentum balance equation is a differential equation of first order.

The Buckingham Reiner Equation

A Bingham fluid in a pipe will start to flow once the wall shear stress exceeds the yield point $\tau_o$ of the fluid. In such cases, the relation between the shear rate and the shear stress may be given by:

$$\tau_{yx} = -\mu_0 \frac{\partial v_x}{\partial y} \pm \tau_0. \tag{4}$$

Here $\mu_o$ is the plastic viscosity of the fluid. If the wall shear stress is less than the yield point the shear rate $\partial v_x/\partial y$ is zero everywhere. For flow of this type, it is possible to express the volumetric rate of flow Q to the other quantities:

$$Q = \frac{\pi R^3}{4\mu_0}\tau_R\left(1 - \frac{4}{3}\frac{\tau_0}{\tau_R} + \frac{1}{3}\left(\frac{\tau_0}{\tau_R}\right)^4\right). \tag{5}$$

Introducing the non dimensional rate of flow y:

$$y = \frac{4Q}{\pi R^3}\frac{\mu_0}{\tau_0}, \tag{6}$$

and the ratio of the yield point to the wall shear stress as:

$$x = \frac{\tau_0}{\tau_R} \tag{7}$$

The equation {3}; for the volumetric rate of flow may be cast in the form of a quartic:

$$x^4 - (4+3y)x + 3 = 0 \qquad \{8\}$$

The solution of this equation is given in FIG. 1b. The point with x=1 and y=0 is the point identifying no flow as the wall shear stress is equal to the yield point.

The simple theory above suffices to compute material properties of the MFT from measured rate of flow and pressure gradient. The equation for the volumetric rate of flow, equation {3} relates rate of flow, pressure gradient, yield point and plastic viscosity. If one were to measure, simultaneously, the rate of flow and the pressure gradient then either the yield point or the plastic viscosity of the fluid can be calculated with the help of equation {3}. Thus if the yield point of the fluid were known and the pressure gradient is measured the non dimensional quantity x can be substituted into equation {6} and y can be solved for.

With a known measured value of the rate of flow, the plastic viscosity can thus be retrieved and the wall shear rate $\gamma_R$ then follows as:

$$\gamma_R = \frac{\tau_R - \tau_o}{\mu_o}. \qquad \{9\}$$

One drawback of this method to find the wall shear rate is that it assumes the existence of Bingham flow and it requires that at least one parameter of the two parameter Bingham model is known a-priori. In more complicated, three parameter rheological models this may become worse.

Yet the theory presented lends itself well and supports the designing of the experiment set forth in the aforementioned provisional application, where pressure gauges and velocity (profile) meters may be placed and specified.

The Rabinowitsch Weissenberg Equation

There is a way to derive the wall shear rate from measurement of the rate of flow and the wall shear stress only. The Rabinowitsch equation is known in the art, was first derived by Weissenberg in 1929, and is an expression of the wall shear in terms of the slope of the rate of flow versus wall shear stress on a double log plot. The derivation of this equation starts with the general expression for the volumetric flow rate Q from some velocity profile v(r):

$$Q = 2\pi \int_0^R v(r) r \, dr, \qquad \{10\}$$

Integration by parts then results in:

$$Q = -\pi \int_0^R r^2 \left(\frac{dv}{dr}\right) dr. \qquad \{11\}$$

Upon a coordinate transformation to remove the radial coordinate in favour of the shear stresses:

$$\frac{r}{R} = \frac{\tau}{\tau_R}, \qquad \{12\}$$

it follows that:

$$\left(-\frac{dv}{dr}\right) = \gamma_R = \frac{1}{\pi R^3 \tau_R^2} \frac{d}{d\tau_R}(\tau_R^3 Q). \qquad \{13\}$$

Simple manipulations then lead to the result:

$$\gamma_R = \frac{Q}{\pi R^3}\left(3 + \frac{d\log Q}{d\log \tau_R}\right). \qquad \{14\}$$

This equation is known as the Rabinowitsch-Weissenberg equation. Its derivation requires no assumptions as to the constitutive equation of the fluid. The equation holds true for homogenous, isothermal flow without momentum mixing.

Since the computation of the wall shear rate by equation {12} requires that the flow rate and pressure gradient are cross plotted on log scales, a single measurement of flow rate and pressure gradient cannot give the wall shear rate. Therefore application of the Rabinowitsch equation can only be successful on historical data looking back a certain amount in time. The time lag thus introduced may not be ideal for some types of control applications.

Wall Shear Stress and Shear Rate

Solutions of the Buckingham-Reiner equation in a non-dimensional form using equation {6} were obtained numerically and examined with a two-fold objective:
1. To find appropriate distance over which the pressure gradient must be gauged given a certain sensitivity of commercially available differential pressure gauges.
2. To find a quantity that responds little with natural variations in rate of flow whereas simultaneously responding strongly to changes in the MFT rheological parameters.

It is shown herein that the latter objective is fulfilled by the ratio of the wall shear stress to the wall shear rate, called. The predicted quantities are as follows:
1. The wall shear stress.
2. The wall shear rate.
3. The ratio of wall shear stress to wall shear rate.
4. The pressure gradient.
5. The differential pressure over a certain distance.

All predictions may be carried out with the help of the non-dimensional Buckingham-Reiner equation, equation {6}.

Ultimately, consistent with the aforementioned monitoring methods 1 and 2a, the present invention aims to control the injection rate by measuring a quantity that responds strongly to a change in MFT rheological properties. The one quantity that does respond to both is the ratio of wall shear stress to wall shear rate; $\zeta$. Since the MFT rheological properties will show natural variability dosing of polymer needs to be controlled. It appears that keeping $\zeta$ constant by varying the polymer dosing would result in constant 'product' qualities.

Turbulence

Alternatively, and consistent with aforementioned monitoring method 3, in turbulent flow the wall shear stress is still given by equation {1}. This is simply an expression of an integral momentum balance which holds regardless of the intricacies of the flow. Whereas the flows described above show a behaviour where the pressure gradient scales linearly with the rate of flow, in turbulent flow the pressure gradient scales super linearly, quadratically in fact, with the rate of flow.

The Kolmogorov Theory

The theory of homogenous isotropic turbulence as developed by Kolmogorov predicts that the energy spectrum P as a function of the wave number k is:

$$P(k) = c(\varepsilon)^{2/3} k^{-5/3}. \quad \{15\}$$

Here c is a constant, ε is the rate of energy dissipation per unit mass which can be cast into the product of velocity v time pressure gradient dp/dx:

$$\dot{\varepsilon} = \frac{1}{\rho} v \frac{dp}{dx}. \quad \{16\}$$

Density is denoted ρ. Expressing the pressure gradient in terms of the dynamic head, pipe radius R and a constant friction coefficient f:

$$\frac{dp}{dx} = f \frac{1}{R} \rho v^2, \quad \{17\}$$

it is easy to express Kolmogorov's equation in terms of the wavenumber k and the velocity v plus three constant terms. The energy spectrum may be expressed in decibels in order to make it comparable to measured data from a sonar array.

$$10^{10} \log(P) = PdB = \quad \{18\}$$
$$10\left( {}^{10}\log(c) + \frac{2}{3} {}^{10}\log(f) - \frac{2}{3} {}^{10}\log(R) + 2 {}^{10}\log(v) - \frac{5}{3} {}^{10}\log(k) \right)$$

The equation above shows that the energy spectrum at constant velocity v should be much like a constant minus 5/3 times the log of the wavenumber. After all both R and f can be treated as constants in this case and c is a constant by definition.

In the Kolmogorov theory, the wavenumber k may be used in preference over a frequency because the wavenumber is more closely related to the breakdown of vortical structures in the flow. Such vortical structures have a maximum length scale equal to the pipe diameter and the maximum wavelength that can occur is therefore equal to the pipe diameter. The Kolmogorov theory postulates that this energy is distributed over ever smaller length scales without any dissipation until the smallest length scale (appropriately called the Kolmogorov length scale) is reached where the energy is finally dissipated into heat. The Kolmogorov length scale l is:

$$\ell = \sqrt[4]{\left(\frac{\upsilon}{\varepsilon}\right)}, \quad \{19\}$$

where υ is the kinematic viscosity of the fluid and ε is again the rate of dissipation of energy per unit mass. For a typical flow of MFT this works out to be 0.2 mm. A Kolmogorov time scale can be derived as well:

$$\tau_l = \sqrt{\frac{\upsilon}{\varepsilon}} \quad \{20\}$$

The ratio of the length scale and the time scale is then a velocity, the Kolmogorov velocity which equal:

$$u_l = \sqrt{\upsilon \varepsilon} \quad \{21\}.$$

Representative values for these two numbers are 6 ms and 0.1 ft/s for a typical MFT.

Measured Vortical Power Spectra

A sonar array may be used to measure a vortical power distribution along the line of the volumetrically averaged velocity in the wavenumber—frequency diagram. Plotting this power distribution versus the wavenumber for a number of pipe sizes we see a striking pattern as shown in FIG. 1c.

The spectra given above are for fully developed turbulent flow in water. The peaks in this spectrum are an aliasing artefact caused by finite spatial sampling. For each pipe size the first peak appears at twice the spatial Nyquist. The spectra between, say 1 and 20 rad/ft, however can be fitted well with equation {16}. It is the combination of the ability to measure the energy spectrum and the knowledge of how the spectrum must look in the case of fully developed turbulent flow that provides an opportunity for monitoring the progression of the floccing reaction in polymer treated MFT.

The pipe size lends itself well to scale the wavenumber to. Scaled as per a factor $D^{3/5}$ the vortical spectra for pipes of different diameter collapse to broadly one line. Naturally this scaling pulls the peaks in the spectra apart as the scaled version the Nyquist spatial sampling rate is no longer the same for each pipe. The result of this scaling is shown in FIG. 1d.

Vortical spectra for a constant pipe diameter but different flow velocity are shown in FIG. 1e. The range of velocities covers about one decade starting at what is close to the minimum measurable velocity in turbulent flow. Much like the previous spectra for constant velocity the spectra follow the Kolmogorov prediction over a wide range of wavenumbers. In this case, the length scale being fixed by the constant pipe diameter the curves should follow the pattern of a constant plus 2 times the log of velocity. The fitted lines show that is indeed the case between wavenumbers of 2 and 20 rad/ft.

The velocity term can be subtracted on both sides of equation {16} which should result, as before in a collapse of all curves onto one. The results are shown in FIG. 1e.

A sonar meter does not provide vortical spectra, and vortical spectra can only be obtained in post-processing of raw time series data. However, the sonar meter can provide a quantity related to the vortical power spectra. This quantity, called "quality" is a number which is the normalized difference of the sum of vortical power along forward and backward direction. The normalization of the difference means that the value of quality is always a number between 0 and 1 but not on linear. "Quality" is normally an indicator of how well the sonar meter is able to measure the rate of flow with qualities well over 0.9 being quite normal. In the case of floccing MFT, quality may serve as an indicator of the degree of turbulence.

FIGS. 2-3

The aforementioned basic understanding consistent with monitoring methods 1, 2a and 3 was implemented in relation to the apparatus 10 shown in FIG. 2, which includes a signal processor or processing module 10a and a process pipe 12 having a fluid F containing MFTs flowing through the process pipe 12. The signal processor or processing module 10a is configured at least to receive signaling $S_a$, $S_b$, $S_c$ containing information about at least one rheological parameter related to the fluid containing the MFTs flowing through the process pipe 12; and determine a dosing of a polymer to the fluid so as to cause a polymer induced agglomeration of the MFTs in the fluid, based at least partly on the signaling received.

By way of example, the signaling $S_a$, $S_b$, $S_c$ may be received from at least one measuring or sensing device 20a, 20b, 20c arranged in relation to the process piping 12. In operation, the at least one measuring or sensing device 20a, 20b, 20c may be configured to measure or sense the information about the at least one rheological parameter and provide the signaling $S_a$, $S_b$, $S_c$ containing the information about the at least one rheological parameter to the signal processor or processing module 10a.

By way of example, the signal processor 10a may also be configured to provide corresponding signaling $S_d$ to control the dosing of the polymer to cause the polymer induced agglomeration of the MFTs in the fluid, according to some embodiment of the present invention. The scope of the invention is not intended to be limited to the type or kind of use of the corresponding signaling, including for further processing, printing, displaying, or flow or process control, as well as for other types or kinds of uses either now known or later developed in the future. In FIG. 2, the apparatus 10 includes a dosing device 22 configured in relation to the process piping 12, and configured to respond to the corresponding signaling $S_d$ and to provide the dosing of the polymer to cause the polymer induced agglomeration of the MFTs in the fluid F in the process piping 12. By way of example, the signal processor 10a may be configured to determine an injection rate of the dosing of the polymer, consistent with that disclosed herein.

The signal processor 10a may be configured to determine the dosing of the polymer based at least partly on a change in the at least one rheological parameter. For example, the at least one rheological parameter may include information about, or related to, a wall shear stress and a wall shear rate of the fluid. The signal processor 10a may be configured to determine the dosing of the polymer based at least partly on a ratio $\zeta$ of the wall shear stress and the wall shear rate. The signal processor may be configured to determine the dosing of the polymer based at least partly on keeping the ratio $\zeta$ substantially constant by varying the dosing of the polymer. By way of example, the signal processor 10a may be configured to determine the dosing of the polymer using a signal processing algorithm based at least partly on the Buckingham Reiner equation, consistent with that disclosed herein.

The signaling $S_a$, $S_b$, $S_c$ received may contain information about measurements related to a flow rate and a pressure gradient of the fluid; and the signal processor 10a may be configured to determine the wall shear stress based at least partly on flow rate and pressure gradient measurements received. In this case, the at least one measuring or sensing device 20a, 20b, 20c may include at least one flow rate and pressure gradient measuring device configured to measure the flow rate and the pressure gradient of the fluid, and provide the signaling containing information about the flow rate and pressure gradient measurements.

The signal processor 10a may be configured to determine the wall shear stress $\tau_R$, using a signal processing algorithm based at least partly on equation (1), as follows:

$$\tau_R = \frac{R}{2}\frac{dp}{dx}, \tag{22}$$

where R is the inside radius of the process pipe and dp/dx is the pressure gradient along the axial dimension of the process pipe, consistent with that disclosed herein.

The signaling $S_a$, $S_b$, $S_c$ received may contain information about measurements related to a differential pressure and a velocity profiling related to the fluid; and the signal processor 10a may be configured to determine the wall shear stress based at least partly on differential pressure measurements related to the differential pressure, determine the wall shear rate based at least partly on velocity profiling measurements related to the velocity profiling, and monitor the wall shear stress simultaneously with the wall shear rate. In this case, the at least one measuring or sensing device 20a, 20b, 20c may include at least one differential pressure and velocity profiling measuring device configured to measure the differential pressure and the velocity profiling related to the fluid and provide the signaling containing information about the differential pressure and velocity profiling measurements.

The at least one rheological parameter may include, or take the form of, information about energy dissipation related to the fluid. In this case, the signaling $S_a$, $S_b$, $S_c$ received may contain information about array velocity measurements related to the fluid; and the signal processor 10a may be configured to monitor a rate of energy dissipation related to the fluid, based at least partly on the array velocity measurements. The at least one measuring or sensing device 20a, 20b, 20c may include at least one array velocity sensing device configured to sense the array velocity measurements related to the fluid and provide the signaling received contains information about the array velocity measurements.

The signal processor 10a may be configured to determine a relationship between the wall shear rate and the wall shear stress, using a signal processing algorithm based at least partly on equation (2), as follows:

$$\tau_{yx} = -\mu_0 \frac{\partial v_x}{\partial y} \pm \tau_0, \tag{23}$$

where $\mu_o$ is the plastic viscosity of the fluid and $\tau_o$ is a yield point of the fluid, consistent with that disclosed herein.

By way of further example, FIG. 3 shows the apparatus 10 according to some embodiments in the form of the signal processor or processing module 10a configured at least to:
receive signaling containing information about at least one rheological parameter related to a fluid containing MFTs flowing through a process pipe; and
determine a dosing of a polymer to the fluid so as to cause a polymer induced agglomeration of the MFTs in the fluid, based at least partly on the signaling received.

The apparatus 10 may also include other circuits, components or modules 10b to implement the functionality of the signal processor or processing module 10a either now known or later developed in the future, e.g., including memory modules, input/output modules, data and busing architecture and other signal processing circuits, wiring or components, consistent with that known by a person skilled in the art, and/or consistent with that set forth herein. By way of example, other circuits, components or modules 10b may include an input module configured to receive the signaling and provide the same to the signal processing module 10a, and may also be configured with an output module configured to provide the corresponding signaling from the signal processing module 10a. By way of further example, and according to some embodiments of the present invention, the signal processor or processing module 10a may be configured with at least one processor and at least one memory including computer program code, the at least one memory and computer program code configured, with the at least one processor, to cause the apparatus at least to receive the signaling and determine the dosing of the polymer to the fluid so as to cause the polymer induced agglomeration of the MFTs in the fluid, based at least partly on the signaling received.

Moreover, in FIG. 2 the process piping 12 has a tapping flange T arranged in relation to it, for tapping into the process piping 12 if needed. It is also important to note that the scope of the invention is not intended to be limited to the type or kind of industrial process of which the fluid is being processed, including a process or processes that is or are either now known or later developed in the future.

Signal Processor or Signal Processing Module 10a

By way of example, and consistent with that described herein, the functionality of the signal processor or processing module 10a may be implemented to receive the signaling, process the signaling, and/or provide the corresponding signaling, using hardware, software, firmware, or a combination thereof, although the scope of the invention is not intended to be limited to any particular embodiment thereof. In a typical software implementation, the signal processor or processing module 10a may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 10a as either part of the aforementioned apparatus, as a stand alone module, or in the combination with other circuitry for implementing another module.

Techniques for receiving signaling in such a signal processor or processing module 10a are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a without undue experimentation so as to receive signaling containing information about at least one rheological parameter related to a fluid containing MFTs flowing through a process pipe. Based on this understanding, a person skilled in the art would appreciate, understand and be able to implement and/or adapt the signal processor or processing module 10a without undue experimentation so as to determine a dosing of a polymer to the fluid so as to cause a polymer induced agglomeration of the MFTs in the fluid, based at least partly on the signaling received.

FIGS. 4-7: Known SONAR-Based Signal Processing Techniques

By way of further example, in the known SONAR-based signal processing technique unsteady pressures-based electrical responses to an associated transiting flow perturbation of an associated fluid flowing in an associated pipe may be sensed using pressure sensor at different axial locations as the fluid flows along the pipe, and correlated and further processed to determine the flow rate of the fluid flowing in the pipe, consistent with that shown and described below in relation to FIGS. 4-7.

By way of example, known SONAR-based signal processing techniques that may be adapted and utilized by a person skilled in the art without undue experimentation to implement the present invention may include, or take the form of that disclosed below in relation to that shown in FIGS. 4-7, as follows:

Example of Known Signal Processing Technology

By way of example, FIGS. 4-7 disclose known signal processing technology shown and described in U.S. Pat. No. 6,609,069 and U.S. Pat. No. 6,889,562, each of which are incorporated herein by reference in their entireties, related to unsteady pressures along a pipe caused by coherent structures (e.g., turbulent eddies and vortical disturbances) that convect with a fluid flowing in the pipe contain useful information regarding parameters of the fluid, where the unsteady pressures along the pipe are sensed using a spatial array 110 of at least two sensors 112 shown in FIG. 4. FIG. 4 shows apparatus for measuring the velocity and/or volumetric flow of a fluid flowing within a pipe that is also similar to that described, by way of example, in U.S. Pat. No. 7,400,985; U.S. Pat. No. 7,673,524; U.S. Pat. No. 7,895,903, as well as U.S. Patent publication No. US 2004/0168512, which are all hereby incorporated herein by reference. The present invention described in relation to FIGS. 2 and 3 above provides various new means for using this underlying signal processing technology to determine parameters of a fluid flow, such as, for example, flow rate as shown and described in relation to FIGS. 4-7, based at least partly on the use of a tomographic imaging technique consistent with that as described in relation to FIGS. 2-3 that may be used as a part of the signal processing technique modeled and based, e.g., on that described in relation to the spatial array 110 of the at least two sensors 112 shown in FIG. 4.

In FIG. 4, the known apparatus 100 measures at least one parameter associated with a flow 102 flowing within a duct, conduit or other form of pipe 104, wherein the parameter of the flow 102 may include, for example, at least one of the velocity of the flow 102 and the volumetric flow rate of the flow 102. The flow 102 is shown passing through the pipe 104, wherein the flow 102 is depicted as a non-stratified, Newtonian flow operating in the turbulent regime at Reynolds numbers above about 100,000. The flow 102 has a velocity profile 106 that is uniformly developed from the top of the pipe 104 to the bottom of the pipe 104. Furthermore, the coherent structures 108 in the non-stratified, turbulent, Newtonian flow 102 exhibit very little dispersion. In other words, the speed of convection of the coherent structures 108 is not strongly dependent on the physical size of the structures 108. It should be appreciated that, as used herein, dispersion describes the dependence of convection velocity with wavelength, or equivalently, with temporal frequency. It should also be appreciated that flows for which all wavelengths convect at a constant velocity are termed "non-dispersive" and for turbulent, Newtonian flow, there is typically not a significant amount of dispersion over a wide range of wavelength to diameter ratios.

While the flow 102 is depicted as having a uniform velocity profile, it should be appreciated that the present invention may be used to measure stratified flows 102. Stratified flow 102 has a velocity profile 106 that is skewed from the top of the pipe 104 to the bottom of the pipe 104, as may be found in industrial fluid flow processes involving the transportation of a high mass fraction of high density, solid materials through a pipe 104 where the larger particles travel more slowly at the bottom of the pipe 104. For example, the flow 102 may be part of a hydrotransport process.

The apparatus 100 of FIG. 4 measures parameters such as velocity and volumetric flow rate of a stratified flow and/or non-stratified flow 102, wherein the apparatus 100 may include a spatial array 110 of at least two sensors 112 disposed at different axial locations $x_1 \ldots x_N$ along the pipe 104. Each of the sensors 112 provides a pressure signal P(t) indicative of unsteady pressure created by coherent structures convecting with the flow 102 within the pipe 104 at a corresponding axial location $x_1 \ldots x_N$ of the pipe 104. The pressure generated by the convective pressure disturbances (e.g., eddies 108) may be measured through strained-based sensors 112 and/or pressure sensors 112. The sensors 112 provide analog pressure time-varying signals $P_1(t)$, $P_2(t)$, $P_3(t) \ldots P_N(t)$ to a signal processor 114, which determines the parameter of the flow 102 using pressure signals from the sensors 112, and outputs the parameter as a signal 116.

While the apparatus 100 is shown as including four sensors 112, it is understood that the array 110 of sensors 112 may include two or more sensors 112, each providing a pressure signal P(t) indicative of unsteady pressure within the pipe 104 at a corresponding axial location X of the pipe 104. Generally, the accuracy of the measurement improves as the number of sensors 112 in the array 110 increases. Thus, the degree of accuracy provided by the greater number of sensors 112 is offset by the increase in complexity and time for computing the desired output parameter of the flow 102 and the number of sensors 112 used is dependent at least in part on the degree of accuracy desired and the desire update rate of the output parameter provided by the apparatus 100.

The signals $P_1(t) \ldots P_N(t)$ provided by the sensors 112 in the array 110 are processed by the signal processor 114, which may be part of a larger processing unit 118. For example, the signal processor 114 may be a microprocessor and the processing unit 118 may be a personal computer or other general purpose computer. It is contemplated that the signal processor 114 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 114 may output the one or more parameters 116 to a display 120 or another input/output (I/O) device 122. The I/O device 122 may also accept user input parameters. The I/O device 122, display 120, and signal processor 114 unit may be mounted in a common housing, which may be attached to the array 110 by a flexible cable, wireless connection, or the like. The flexible cable may also be used to provide operating power from the processing unit 118 to the array 110 if necessary.

To determine the one or more parameters 116 of the flow 102, the signal processor 114 applies the data from the sensors 112 to flow logic 124 executed by the signal processor 114. Referring to FIG. 6, an example of flow logic 124 is shown. Some or all of the functions within the flow logic 124 may be implemented in software (using a microprocessor or computer) and/or firmware, or may be implemented using analog and/or digital hardware, having sufficient memory, interfaces, and capacity to perform the functions described herein.

The flow logic 124 may include a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega)$, $P_2(\omega)$, $P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

Figure 7:
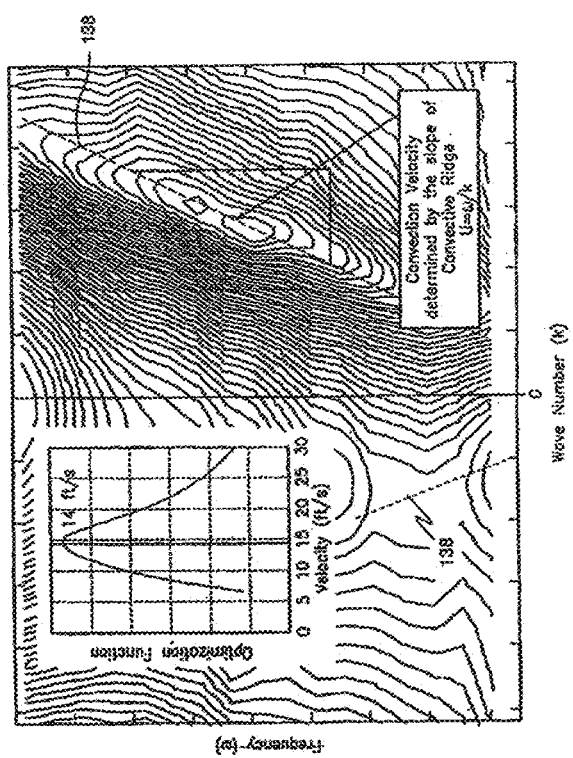
FIG. 7 is a k-ω plot of data processed from an apparatus known in the art that illustrates the slope of the convective ridge, and a plot of the optimization function of the convective ridge.

One technique of determining the convection velocity of the coherent structures (e.g., turbulent eddies) 108 within the flow 102 is by characterizing a convective ridge of the resulting unsteady pressures using an array of sensors or other beam forming techniques, similar to that disclosed U.S. Pat. No. 6,609,069, which is incorporated herein by reference in its entirety. A data accumulator 130 accumulates the frequency signals $P_1(\omega)-P_N(\omega)$ over a sampling interval, and provides the data to an array processor 132, which performs a spatial-temporal (two-dimensional) transform of the sensor data, from the x-t domain to the k-ω domain, and then calculates the power in the k-ω plane, as represented by a k-ω plot (FIG. 7).

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where $\lambda$ is the wavelength of a spectral component, and corresponding angular frequencies given by $\omega=2\pi v$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensors 112 apart from each other and yet still be within the coherence length.

Convective characteristics or parameters have a dispersion relationship that can be approximated by the straight-line equation, $$k=\omega/u, \quad \text{(Eqn. 1)}$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. As will be described hereinafter, as the flow becomes increasingly dispersive, the convective ridge becomes increasingly non-linear. What is being sensed are not discrete events of coherent structures 108, but rather a continuum of possibly overlapping events forming a temporally stationary, essentially white process over the frequency range of interest. In other words, the convective coherent structures 108 are distributed over a range of length scales and hence temporal frequencies.

To calculate the power in the k-ω plane, as represented by a k-ω plot (see FIG. 7) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 112. It should be appreciated that the present embodiment may use temporal and spatial filtering to precondition the signals to effectively filter out the common mode characteristics Pcommon mode and other long wavelength (compared to the sensor spacing) characteristics in the pipe 104 by differencing adjacent sensors 112 and retain a substantial portion of the stochastic parameter associated with the flow field and any other short wavelength (compared to the sensor spacing) low frequency stochastic parameters.

In the case of suitable coherent structures 108 being present, the power in the k-ω plane shown in a k-ω plot of FIG. 7 shows a convective ridge 138. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 138 with some slope, the slope indicating the flow velocity.

Once the power in the k-ω plane is determined, a convective ridge identifier 134 uses one or another feature extraction method to determine the location and orientation (slope) of any convective ridge 138 present in the k-ω plane. For example, in one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information. An analyzer 136 examines the convective ridge information including the convective ridge orientation (slope) and assuming the straight-line dispersion relation given by k=ω/u, the analyzer 136 determines the flow velocity and/or volumetric flow, which are output as parameters 116. The volumetric flow may be determined by multiplying the cross-sectional area of the inside of the pipe 104 with the velocity of the process flow 102.

As previously noted, for turbulent, Newtonian fluids, there is typically not a significant amount of dispersion over a wide range of wavelength to diameter ratios. As a result, the convective ridge 138 in the k-ω plot is substantially straight over a wide frequency range and, accordingly, there is a wide frequency range for which the straight-line dispersion relation given by k=ω/u provides accurate flow velocity measurements. For stratified flows, however, some degree of dispersion exists such that coherent structures 108 convect at velocities which depend on their size. As a result of increasing levels of dispersion, the convective ridge 138 in the k-ω plot becomes increasingly non-linear. Thus, unlike the non-dispersive flows, determining the flow rate of a dispersive mixture by tracking the speed at which coherent structures 108 convect requires a methodology that accounts for the presence of significant dispersion, as described in greater detail in U.S. Patent publication No. 2005/0246111, which is incorporated herein by reference.

In the embodiment shown in FIG. 4 and FIG. 5, each of the sensors 112 is formed by a strip of piezoelectric material 140 such as, for example, the polymer, polarized fluoropolymer, PVDF, which measures the strain induced within the pipe 104 due to the coherent structures convecting with the flow 102, similar to that described in U.S. Pat. No. 7,400,985, which is incorporated herein by reference. The sensors 112 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The PVDF sensors include PVDF material disposed between a pair of conductive layers. The conductive layers are electrically connected to a processor by a pair of twisted wires, wherein the conductive layer may be formed of silver ink. The strips of piezoelectric film material forming the sensors 112 along each axial location $x_1 \ldots x_N$ of the pipe 104 may be adhered to the surface of a steel strap 142 (e.g., a hose clamp) that extends around and clamps onto the outer surface of the pipe 104. As discussed hereinafter, other types of sensors 112 and other methods of attaching the sensors 112 to the pipe 104 may be used.

As shown in FIG. 5, the PVDF material 140 of each sensor 112 is disposed substantially around the circumference of the pipe 104, which enables the sensing material 140 to measure pressure disturbances attributed to the convective vortices 106 propagating with the fluid flow 102. The configuration of the sensing material being disposed substantially around the circumference of the pipe 104 filters out pressure disturbances associated with vibration and other bending modes of the pipe 104. Unfortunately, the sensors 112 also sense unsteady pressure attributed to acoustic pressures or noise within the pipe 104, wherein the measurement of these acoustic pressures decreases the signal to noise ratio when measuring the convective turbulence 106.

In the geometry of the sensors 112 (in FIG. 5), asymmetric bending modes create equal and opposite deformation of the sensor 112 and therefore create no signal. Acoustic modes create a uniform distortion, and therefore create a signal along with a signal associated with vortical disturbances. (One might expect the acoustic signal to scale with the sensor length and the vortical signal to scale as the square root of the sensor length.) Additionally, pressure pulses and pipe fluids with uniform varying temperatures should also produce signals in this configuration. These signals, i.e. signals from the acoustic pressures, the pressure pulses, and the varying temperature fluids may degrade the measurement of the vortical pressure disturbance (vortical signals).

One method of filtering the acoustic noise is to difference the signals of adjacent sensors 112. While this increases the signal to noise ratio, it would be advantageous if each sensor 112 had the ability to filter both the unsteady pressures associated with the bending modes of the pipe 104 and the acoustic noise (or pressure field).

It should be appreciated that in any of the embodiments described herein, the sensors 112 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor 112 and the pipe 104. The sensors 112 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104. If desired, for certain applications, gratings may be detached from (or strain or acoustically isolated from) the pipe 104 if desired. It is also contemplated that any other strain sensing technique may be used to measure the variations in strain in the pipe 104, such as highly sensitive piezoelectric, electronic or electric, strain gages attached to or embedded in the pipe 104.

It should be further appreciated that in various embodiments of the present invention, a piezo-electronic pressure transducer may be used as one or more of the pressure sensors and it may measure the unsteady (or dynamic or ac) pressure variations inside the pipe 104 by measuring the pressure levels inside the pipe 104. For example, in one embodiment of the present invention, the sensors 112 may comprise pressure sensors manufactured by PCB Piezotronics of Depew, N.Y. and/or may include integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 112 may incorporate a built-in MOSFET microelectronic amplifier to convert the high-impedance charge output into a low-impedance voltage signal. The sensors 112 may be powered from a constant-current source and can operate over long coaxial or ribbon cable without signal degradation. It should be appreciated that the low-impedance voltage signal is not affected by triboelectric cable noise or insulation resistance-degrading contaminants and power to operate integrated circuit piezoelectric sensors generally takes the form of a low-cost, 24 to 27 VDC, 2 to 20 mA constant-current supply. Most piezoelectric pressure sensors are constructed with either compression mode quartz crystals preloaded in a rigid housing, or unconstrained tourmaline crystals. These designs advantageously give the sensors microsecond response times and resonant frequencies in the hundreds of kHz, with minimal overshoot or ringing, wherein small diaphragm diameters ensure spatial resolution of narrow shock waves.

Additionally, the output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 112 may include a piezoelectric sensor that provides a piezoelectric material to measure the unsteady pressures of the flow 102. The piezoelectric material, such as the polymer, polarized fluoropolymer, PVDF, measures the strain induced within the process pipe 104 due to unsteady pressure variations within the flow 102. Strain within the pipe 104 is transduced to an output voltage or current by the attached piezoelectric sensors 112. The PVDF material forming each piezoelectric sensor 112 may be adhered to the outer surface of a steel strap that extends around and clamps onto the outer surface of the pipe 112. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique include non-intrusive flow rate measurements, low cost, a measurement technique requires no excitation source (i.e. ambient flow noise is used as a source), flexible piezoelectric sensors can be mounted in a variety of configurations to enhance signal detection schemes (these configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals) and higher temperatures (140 C) (co-polymers).

It should be appreciated that the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Experimental Results

Experiments were conducted consistent with that set forth in the aforementioned provisional application, which are summarized below:

The equipment used to gather data is summarized here in Table 1.

TABLE 1

Summary of measurement equipment

| Location of installation | Type of instrument | Quantities determined |
|---|---|---|
| Upstream | Velocity profile meter | Velocity<br>Quality<br>Temperature<br>Sound Pressure Level |
| Midstream | Velocity profile meter | Velocity<br>Quality<br>Temperature<br>Sound Pressure Level |
| Downstream | Velocity profile meter | Velocity<br>Quality<br>Temperature<br>Sound Pressure Level |
| Polymer line | Gas volume fraction meter | Speed of sound<br>Gas holdup |
| Upstream | Differential pressure gauge | Differential pressure |
| Midstream | Differential pressure gauge | Differential pressure |
| Downstream | Differential pressure gauge | Differential pressure |
| Main MFT feed line | Differential pressure gauge | Differential pressure |
| Dredge | DeltaV system | Clay solids<br>Density<br>Flow<br>Polymer metering pump |
| MFT | DeltaV system | Tank level<br>#1 Suction pressure<br>#2 Discharge pressure<br>MFT flow<br>MFT density<br>#2 motor current<br>#1 motor current<br>#2 suction pressure |

FIGS. 8-11

Based on the results of experiments conducted, FIGS. 8-11 shows matrix plots for different dosings, each having the evolving quality of flow from upstream top of pipe in the top left hand corner to downstream bottom of pipe in the bottom right hand corner. FIGS. 8-11 were originally prepared in color, and are shown in gray-scale in the patent application, including having different plots identified by reference labels a, b, c, d and e. The matrix plots show quality on the horizontal axis and the (unbinned) count of occurrence on the left hand axis. A normalized cumulative distribution is given as a solid line. The dotted line is a kernel density estimate using a Gaussian kernel with a width of 0.01.

FIG. 8 shows matrix plots for normal dosing.

FIG. 9 shows matrix plots for underdosing.

FIG. 10 shows matrix plots for transition dosing. During transition dosing only part of the quality data, i.e. that part where the velocity is representative of the rate of flow, may convey information about the dissipation of energy and changes in that mechanism because of changes in the nature of the fluid flow.

FIG. 11 show matrix plots for overdosing.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
   a plurality of sensing devices and a signal processor,
   the signal processor configured to:
   receive from the plurality of sensing devices signaling containing information about at least one rheological parameter related to a fluid containing Mature Fine Tailings (MFTs) flowing through a process pipe along an axial direction of the process pipe, the process pipe comprising an outside circumference; and
   determine corresponding signaling containing information about a dosing of a polymer to the fluid so as to cause a polymer induced fine agglomeration of the MFTs in the fluid, based at least partly on the signaling received, wherein the plurality of sensing devices are located on the outside circumference of the process pipe at different axial locations of the process pipe, the sensing devices configured to sense the at least one rheological parameter and to provide the signaling containing information about the at least one rheological parameter, wherein each of the sensing devices comprises a strip of piezoelectric material surrounding the outside circumference for measuring pressures indicative of the at least one rheological parameter.

2. Apparatus according to claim 1, wherein the signal processor is configured to provide the corresponding signaling to control the dosing of the polymer to cause the polymer induced fine agglomeration of the MFTs in the fluid.

3. Apparatus according to claim 1, wherein the signal processor is configured to determine the dosing of the polymer based at least partly on a change in the at least one rheological parameter.

4. Apparatus according to claim 1, wherein the at least one rheological parameter includes information about, or related to, a wall shear stress and a wall shear rate of the fluid.

5. Apparatus according to claim 4, wherein the signal processor is configured to determine the dosing of the polymer based at least partly on a ratio $\zeta$ of the wall shear stress and the wall shear rate.

6. Apparatus according to claim 5, wherein the signal processor is configured to determine the dosing of the polymer based at least partly on keeping the ratio $\zeta$ substantially constant by varying the dosing of the polymer.

7. Apparatus according to claim 1, wherein the signal processor is configured to determine an injection rate of the dosing of the polymer.

8. Apparatus according to claim 4, wherein
   the signaling received contains information about measurements related to a flow rate and a pressure gradient of the fluid; and
   the signal processor is configured to determine the wall shear stress based at least partly on the measurements received.

9. Apparatus according to claim 4, wherein
   the signaling received contains information about measurements related to a differential pressure and a velocity profiling related to the fluid; and
   the signal processor is configured to determine the wall shear stress based at least partly on the measurements related to the differential pressure, determine the wall shear rate based at least partly on the measurements related to the velocity profiling, and monitor the wall shear stress simultaneously with the wall shear rate.

10. Apparatus according to claim 1, wherein the at least one rheological parameter includes information about energy dissipation related to the fluid, wherein
the received signaling contains information about array velocity measurements related to the fluid; and
the signal processor is configured to monitor a rate of energy dissipation related to the fluid, based at least partly on the array velocity measurements.

11. Apparatus according to claim 4, wherein the signal processor is configured to determine the wall shear stress $\tau_R$, using a signal processing algorithm based at least partly on equation (1), as follows:

$$\tau_R = \frac{R}{2}\frac{dp}{dx}, \quad (1)$$

where R is the inside radius of the process pipe and dp/dx is the pressure gradient along the axial dimension of the process pipe.

12. Apparatus according to claim 11, wherein the signal processor is configured to determine the dosing of the polymer using a signal processing algorithm based at least partly on the Buckingham Reiner equation.

13. Apparatus according to claim 12, wherein the signal processor is configured to determine a relationship between the wall shear rate and the wall shear stress, using a signal processing algorithm based at least partly on equation (2), as follows:

$$\tau_{yx} = -\mu_0 \frac{\partial v_x}{\partial y} \pm \tau_0, \quad (2)$$

where $\mu_o$ is the plastic viscosity of the fluid and $\tau_o$ is a yield point of the fluid.

14. Apparatus according to claim 2, wherein the apparatus further comprises a dosing device configured to respond to the corresponding signaling and to provide the dosing of the polymer to cause the polymer induced fine agglomeration of the MFTs in the fluid.

15. Apparatus according to claim 1, wherein the apparatus further comprises at least one measuring or sensing device configured in relation to the process pipe to measure or sense the information about the at least one rheological parameter and provide the signaling containing the information about the at least one rheological parameter.

16. Apparatus comprising:
a signal processor configured to:
receive signaling containing information about at least one rheological parameter related to a fluid containing Mature Fine Tailings (MFTs) flowing through a process pipe along an axial direction of the process pipe; and
determine corresponding signaling containing information about a dosing of a polymer to the fluid so as to cause a polymer induced fine agglomeration of the MFTs in the fluid, based at least partly on the signaling received, wherein the at least one rheological parameter includes information about, or related to, a wall shear stress and a wall shear rate of the fluid, wherein
the signaling received contains information about measurements related to a flow rate and a pressure gradient of the fluid; and
the signal processor is configured to determine the wall shear stress based at least partly on the measurements received, and wherein the apparatus comprises at least one flow rate and pressure gradient measuring device configured to measure the flow rate and the pressure gradient of the fluid, and provide the signaling containing information about the measurements.

17. Apparatus comprising:
a signal processor configured to:
receive signaling containing information about at least one rheological parameter related to a fluid containing Mature Fine Tailings (MFTs) flowing through a process pipe along an axial direction of the process pipe; and
determine corresponding signaling containing information about a dosing of a polymer to the fluid so as to cause a polymer induced fine agglomeration of the MFTs in the fluid, based at least partly on the signaling received, wherein the at least one rheological parameter includes information about, or related to, a wall shear stress and a wall shear rate of the fluid, wherein
the signaling received contains information about measurements related to a differential pressure and a velocity profiling related to the fluid; and
the signal processor is configured to determine the wall shear stress based at least partly on the measurements related to the differential pressure, determine the wall shear rate based at least partly on the measurements related to the velocity profiling, and monitor the wall shear stress simultaneously with the wall shear rate, and wherein the apparatus further comprises at least one differential pressure and velocity profiling measuring device configured to measure the differential pressure and the velocity profiling related to the fluid and provide the signaling containing information about the measurements.

18. Apparatus comprising:
a signal processor configured to:
receive signaling containing information about at least one rheological parameter related to a fluid containing Mature Fine Tailings (MFTs) flowing through a process pipe along an axial direction of the process pipe; and
determine corresponding signaling containing information about a dosing of a polymer to the fluid so as to cause a polymer induced fine agglomeration of the MFTs in the fluid, based at least partly on the signaling received, wherein the at least one rheological parameter includes information about energy dissipation related to the fluid, wherein
the signaling received contains information about array velocity measurements related to the fluid; and
the signal processor is configured to monitor a rate of energy dissipation related to the fluid, based at least partly on the array velocity measurements, and wherein the apparatus further comprises at least one array velocity sensing device configured to sense the array velocity measurements related to the fluid and provide the signaling received contains information about the array velocity measurements.

19. Apparatus according to claim 1, wherein the signal processor or processing module is configured with at least one processor and at least one memory including computer program code, the at least one memory and computer program code configured, with the at least one processor, to cause the apparatus at least to receive the signaling and determine the flow rate, based at least partly on the signaling received.

* * * * *